(12) United States Patent
Campbell et al.

(10) Patent No.: US 12,372,739 B2
(45) Date of Patent: Jul. 29, 2025

(54) TURRET WITH A ZERO STOP

(71) Applicant: Sheltered Wings, Inc., Barneveld, WI (US)

(72) Inventors: Rick Campbell, Barneveld, WI (US); Joseph Heltemes, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 575 days.

(21) Appl. No.: 17/349,382

(22) Filed: Jun. 16, 2021

(65) Prior Publication Data
US 2021/0389553 A1    Dec. 16, 2021

Related U.S. Application Data

(60) Provisional application No. 63/039,791, filed on Jun. 16, 2020.

(51) Int. Cl.
*G02B 7/16*     (2021.01)
*F41G 1/38*     (2006.01)

(52) U.S. Cl.
CPC . *G02B 7/16* (2013.01); *F41G 1/38* (2013.01)

(58) Field of Classification Search
CPC ........................................................ F41G 1/38
USPC ................................................... 42/122, 135
See application file for complete search history.

(56) References Cited

U.S. PATENT DOCUMENTS

| | | |
|---|---|---|
| 1,425,321 A | 8/1922 | Etherington |
| 2,608,000 A | 8/1952 | Catiglia |
| 2,699,141 A | 1/1955 | Gaguski |
| 2,811,894 A | 11/1957 | Baker |
| 3,037,287 A | 6/1962 | Glatz et al. |
| 3,095,750 A | 7/1963 | Herbert |
| 3,270,418 A | 9/1966 | Simeone et al. |
| 3,904,279 A | 9/1975 | Sanada |
| 3,930,720 A | 1/1976 | Uesugi |
| 3,990,155 A | 11/1976 | Akin, Jr. |
| 4,020,203 A | 4/1977 | Thuler |
| 4,247,161 A | 1/1981 | Unertl, Jr. |
| 4,285,137 A | 8/1981 | Jennie |
| 4,286,388 A | 9/1981 | Ross et al. |

(Continued)

FOREIGN PATENT DOCUMENTS

| | | |
|---|---|---|
| DE | 29720737 U1 | 2/1998 |
| WO | 2010077691 A2 | 7/2010 |

(Continued)

OTHER PUBLICATIONS

International Search Report and Written Opinion issued for International Application No. PCT/US2021/037632 dated Jan. 13, 2022, 8 pages.

(Continued)

*Primary Examiner* — Reginald S Tillman, Jr.
(74) *Attorney, Agent, or Firm* — Husch Blackwell LLP

(57) ABSTRACT

A turret comprises a turret screw, cam pin chassis, stop ring, and turret cap. The cam pin chassis has a cam pin extending from the chassis parallel with the axis and is linear moveable within the chassis. The stop ring has a first surface and a second surface comprising a spiral groove terminating at first and second stop surfaces. The cam pin engages the spiral groove. The screw extends through central bores of each of the turret cap, stop ring, and cam pin chassis such that they have a common rotational axis. A rotational limit of the turret is defined by one of the first and second stop.

18 Claims, 16 Drawing Sheets

(56) References Cited

U.S. PATENT DOCUMENTS

| | | | |
|---|---|---|---|
| 4,373,269 | A | 2/1983 | Doliber et al. |
| 4,554,745 | A | 11/1985 | Repa |
| 4,806,007 | A | 2/1989 | Bindon |
| 4,822,994 | A | 4/1989 | Johnson et al. |
| 5,044,304 | A | 9/1991 | Tomita |
| 5,113,261 | A | 5/1992 | Morisawa |
| RE34,059 | E | 9/1992 | Akitake |
| 5,291,241 | A | 3/1994 | Hirano et al. |
| 5,372,087 | A | 12/1994 | Kato et al. |
| 5,414,595 | A | 5/1995 | Oike et al. |
| 5,752,759 | A | 5/1998 | Pizzo |
| 6,279,259 | B1 | 8/2001 | Otteman |
| 6,351,907 | B1 | 3/2002 | Otteman |
| 6,499,191 | B1 | 12/2002 | Howie, Jr. |
| 6,508,026 | B1 | 1/2003 | Uppiano et al. |
| 6,608,272 | B2 | 8/2003 | Garcia |
| 6,640,481 | B1 | 11/2003 | Williams, Jr. |
| 6,643,970 | B2 | 11/2003 | Huber |
| 6,691,447 | B1 | 2/2004 | Otteman |
| 6,772,550 | B1 | 8/2004 | Leatherwood |
| 6,860,224 | B2 | 3/2005 | Snider |
| 6,862,832 | B2 | 3/2005 | Barrett |
| 7,203,998 | B2 | 4/2007 | Howie, Jr. |
| 7,415,791 | B2 | 8/2008 | Williams et al. |
| 7,440,185 | B1 | 10/2008 | Thorpe et al. |
| 7,578,091 | B2 | 8/2009 | Klepp et al. |
| 7,612,952 | B2 | 11/2009 | Schafer |
| 7,640,830 | B2 | 1/2010 | Bonis |
| 7,793,456 | B1 | 9/2010 | Lacorte |
| 7,827,725 | B1 | 11/2010 | Hagler |
| 7,934,335 | B2 | 5/2011 | Halverson |
| 7,937,879 | B2 | 5/2011 | Hamilton |
| 7,940,830 | B2 | 5/2011 | Marsili et al. |
| 7,958,665 | B2 | 6/2011 | Hamilton |
| 7,997,163 | B2 | 8/2011 | Casas |
| 8,006,429 | B2 | 8/2011 | Windauer |
| 8,166,696 | B2 | 5/2012 | Hamilton |
| 8,397,420 | B2 | 3/2013 | Hamilton |
| 8,490,317 | B2 | 7/2013 | Adkins et al. |
| 8,670,179 | B2 | 3/2014 | Windauer |
| 8,919,026 | B2 | 12/2014 | Hamilton |
| 8,928,878 | B2 | 1/2015 | Jaeschke et al. |
| 8,984,796 | B2 | 3/2015 | Thomas et al. |
| 9,170,068 | B2 | 10/2015 | Crispin |
| 9,677,848 | B2 | 6/2017 | Hamilton |
| 9,958,235 | B2 | 5/2018 | Lassak et al. |
| 9,958,666 | B2 | 5/2018 | Ingenito |
| 10,190,848 | B2 | 1/2019 | VanBecelaere |
| 10,309,749 | B2 | 6/2019 | Hamilton |
| 11,105,587 | B2 | 8/2021 | Hamilton |
| 11,243,049 | B1 | 2/2022 | Enzinger |
| 2003/0131516 | A1 | 7/2003 | Blomdahl |
| 2003/0192224 | A1 | 10/2003 | Kirk |
| 2004/0088898 | A1 | 5/2004 | Barrett |
| 2004/0144013 | A1 | 7/2004 | Leatherwood |
| 2004/0148841 | A1 | 8/2004 | Burzel |
| 2005/0201076 | A1 | 9/2005 | Marcelle et al. |
| 2005/0252065 | A1 | 11/2005 | Scherpf |
| 2006/0171136 | A1 | 8/2006 | Horoho |
| 2007/0103884 | A1 | 5/2007 | Popowich et al. |
| 2007/0137089 | A1 | 6/2007 | William et al. |
| 2007/0175080 | A1 | 8/2007 | Sammut et al. |
| 2007/0195513 | A1 | 8/2007 | Nishiyama et al. |
| 2008/0023309 | A1 | 1/2008 | Montalvo |
| 2008/0066364 | A1 | 3/2008 | Klepp et al. |
| 2009/0205461 | A1 | 8/2009 | Windauer |
| 2009/0241399 | A1 | 10/2009 | Hamilton |
| 2010/0175298 | A1 | 7/2010 | Thomas |
| 2010/0229451 | A1 | 9/2010 | Hamilton |
| 2011/0061285 | A1 | 3/2011 | Hamilton |
| 2011/0100152 | A1 | 5/2011 | Huynh |
| 2011/0102918 | A1 | 5/2011 | Windauer |
| 2011/0242650 | A1 | 10/2011 | Windauer |
| 2012/0186131 | A1 | 7/2012 | Windauer |
| 2013/0167425 | A1 | 7/2013 | Crispin |
| 2013/0276345 | A1 | 10/2013 | Hamilton |
| 2015/0146289 | A1 | 5/2015 | Ingenito |
| 2015/0153138 | A1 | 6/2015 | Presley et al. |
| 2015/0276348 | A1 | 10/2015 | Delaca et al. |
| 2016/0025456 | A1 | 1/2016 | Hamm et al. |
| 2017/0363388 | A9 | 12/2017 | Hamilton |
| 2018/0180383 | A1 | 6/2018 | Lin |
| 2021/0389553 | A1 | 12/2021 | Campbell |
| 2022/0090879 | A1 | 3/2022 | Walker |
| 2022/0244521 | A1 | 8/2022 | Liang |

FOREIGN PATENT DOCUMENTS

| | | |
|---|---|---|
| WO | 2012119574 A1 | 9/2012 |
| WO | 2013158500 A1 | 10/2013 |

OTHER PUBLICATIONS

International Preliminary Report on Patentability issued for International Application No. PCT/US21/37632 dated Dec. 13, 2022, 7 pages.

Extended European Search Report issued for European Patent Application No. 21836803.3 on Jul. 2, 2024, 7 pages.

Stoney Points Target Knob for Leupold, retrieved Aug. 11, 2012. Avaliable at http://www.survivalmonkey.com/threads/stoney-points-target-knob-for-leupold.4380/.

Precision makes the Difference; Scopes of the Police Marksman Line, Schmidt & Bender 2011 Catalog, 14 pages.

International Search Report mailed Jul. 22, 2013 for International Application No. PCT/US2013/036427, 2 pages.

International Search Report and Written Opinion for International Application No. PCT/US2017/015041, mailed Apr. 13, 2017, 10 pages.

Product Nightforce B.E.A.S.T .; website screenshot from www.nighttorceoptics.com/beast; obtained Dec. 3, 2014, 3 pages.

Product Kahles Multizero System; website screenshot from http://www.youtube.com/watch?v=LXwMPIwiSFQ; obtained Dec. 3, 2014.

Product Meopta Ballistic Hunting Turret; website screenshot from http://www.meoptasportsoptics.com/en/ballistic-hunting-turret-installation-1404043008.html; obtained Dec. 3, 2014, 7 pages.

Extended European search report for EP 17205556.8 dated Jun. 15, 2018, 9 pages.

Arrow indicates radial movement of cam pin and dowel

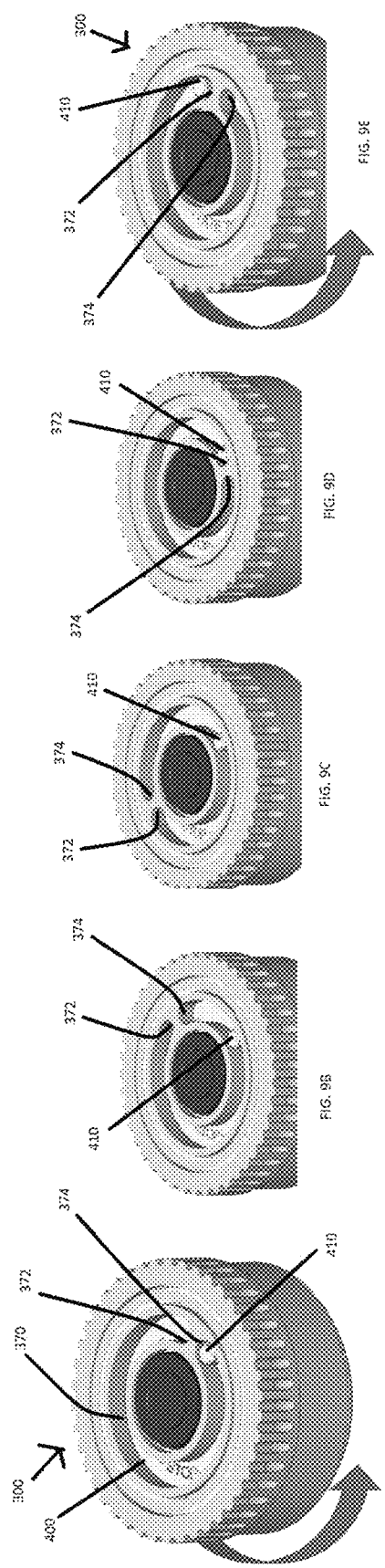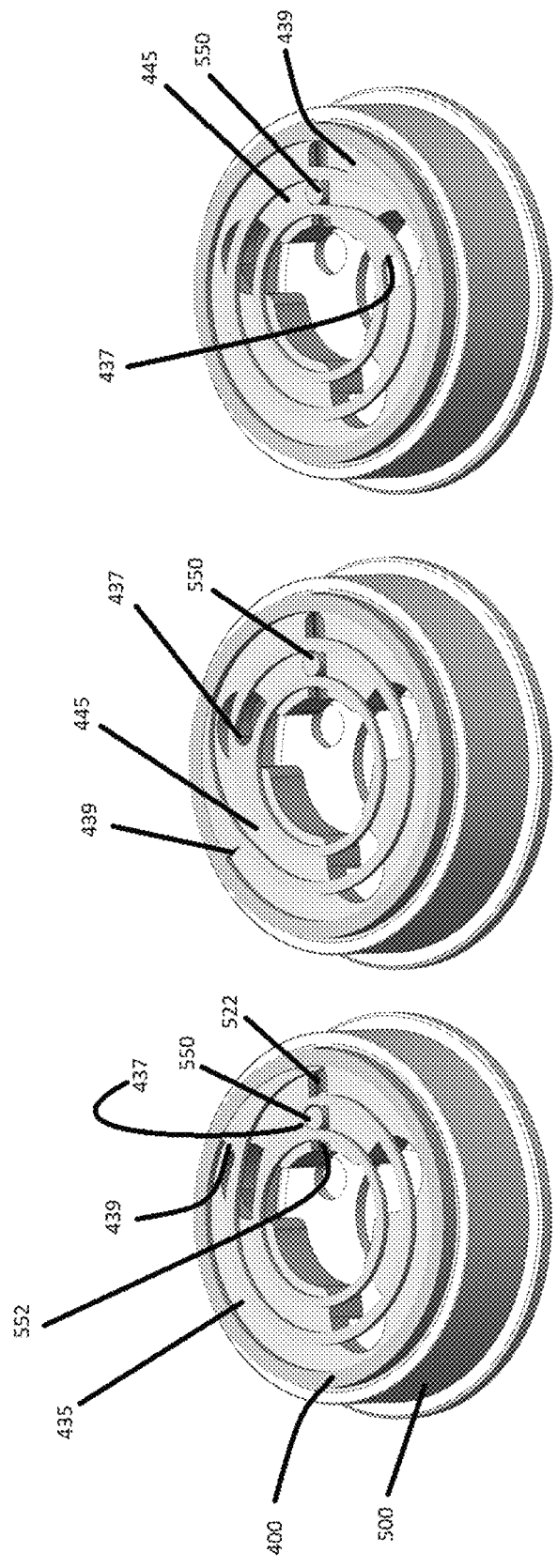

TURRET WITH A ZERO STOP

CROSS-REFERENCE TO RELATED APPLICATIONS

This application claims priority to and is a non-provisional application of U.S. Provisional Application No. 63/039,791 filed Jun. 16, 2020, which is incorporated herein by reference in its entirety.

FIELD

The disclosure relates to a turret for a viewing optic. In one embodiment, the disclosure relates to a turret with a zero stop.

BACKGROUND

Long range shooting has become more and more popular in the USA and around the world in the last decade. Forms of long range shooting include long range hunting, target shooting, competition, law enforcement, and military applications. As long range shooting becomes more popular shooters have become more proficient at shooting and the entire shooting industry has advanced.

One advancement in long range shooting over the past decade is the art of ballistics. As shooting has advanced shooters have desired to have a way to accurately compensate their crosshair for the true point of impact of a bullet at long range. This allows the user to place the crosshair directly on their intended point of impact without having to "hold over" the target for trajectory (or bullet drop) compensation. The way crosshair compensation is normally accomplished is through the turret system.

A turret is one of two or more dials on the outside center part of a riflescope body. Turrets are marked in increments and are used to adjust elevation and windage for points of impact change. Conventional turrets have markings on them that indicate how many clicks of adjustment have been dialed in on the turret, or an angular deviation, or a distance compensation for a given cartridge. A click is one tactile adjustment increment on the windage or elevation turret of a scope.

Turrets are normally marked at each graduation, starting with "0" and increasing as you dial the turret. Often, but not always, turrets can rotate more than one revolution. An example of a common turret would be a turret with 15 MOA of adjustment in one revolution of the turret, graduated in ¼ MOA increments, for a total of 60 positions (or click detents). The detent at each ¼ MOA increment is a clicker, which a person can usually both hear and feel as they click from one detent to the next. If a turret has 15 MOA of travel in one revolution a typical marking scheme on the turret would be to show each full MOA number with a hash mark, but at each intermediate ¼ MOA marking you would only have a hash mark with no number. As a result, the user would see 0 through 14 listed on the turret and 15 MOA would actually be a full rotation back to zero.

The disadvantage occurs if you need to dial more than 15 MOA into the turret. In this case, the user must go more than one revolution, and perform calculations to determine how many MOA have been dialed. For example, on turn 2 or revolution 2, if the turret is stopped at number 5, you would be at 20 MOA (15 MOA+5 MOA=20 MOA).

For very long range shots, one may need to dial 30 MOA or more compensation into the turret to adjust the crosshair appropriately for the bullet trajectory. One way to give enough travel in a turret would be to create a turret with 30 or more MOA of travel in one revolution of the turret. Another method would be to allow the turret to turn more than one revolution. It is not uncommon in the industry to see turrets with 3 or 4 or more revolutions before mechanically running out of total "travel" on the turret.

The advantage of having 30 MOA of travel in one revolution is that you are less likely to need more than one revolution of travel and therefore can simply look at the numbers and know where you dialed without having to do any calculations. The disadvantage to 30 MOA in one revolution is that for a given diameter of turret the ¼ MOA graduations are spaced closer together. Graduations of such close proximity make it difficult for a user to feel each individual click, and make it easier to "skip" over a click accidentally.

The only way to make the clicks feel better is to make the turret larger in diameter so that the mechanical detents are larger. However, for many scopes, this is a disadvantage because the goal is to keep a scope small, streamlined, and lightweight. Hunters, in particular, like more compact, lightweight riflescopes than tactical or competition shooters. Most hunting scopes have an ideal turret size, click feel, and travel per rotation, which means that somewhere around 15 MOA is usually the best amount of turret adjustment per turn.

In addition, it is common when installing a new riflescope onto a rifle to "zero" the rifle. There are also many smartphone apps and other devices that can aid a shooter in calculating their ballistic compensation for a given range and environment, which would be dialed into the turret. For example, a .308 caliber at a 1000 yard shot may need to have a 30 MOA compensation dialed into the turret to place the crosshair in the correct spot in the riflescope in order to compensate for the trajectory of the bullet. After shooting at a long range target, a shooter will normally dial the turret back down to the "0" position.

Another factor important to understand is that in many situations a shooter may be shooting at a target at long range and then another "target of opportunity" suddenly appears at close range. It is well documented and known that in "stressful" situations humans lose their ability for fine motor skills and mostly retain gross motor skill movement.

For the reasons discussed above, having a "zero stop" turret is a big advantage. Thus, there is a large need for a zero stop turret that can address these concerns.

SUMMARY

In one embodiment, the disclosure provides a turret. In accordance with embodiments of the disclosure, a turret having a screw defining an axis comprises a cam pin chassis having a central bore and securing a cam pin, wherein the screw extends through the central bore, the cam pin extends from the chassis parallel with the axis, and the cam pin is linearly moveable within the cam pin chassis; a stop ring having a central bore, a first surface, and a second surface comprising a spiral groove terminating at first and second stop surfaces, wherein the screw extends through the central bore and the cam pin engages the spiral groove; and a turret cap having a central bore, wherein the screw extends through the central bore such that the turret cap, stop ring, and cam pin chassis have a common rotational axis, and wherein rotational limits of the turret are defined by one of the first and second stop surfaces of the stop ring.

In an embodiment, the turret cap has a first surface having a groove terminating at first and second stop surfaces and the first surface of the stop ring comprises a pin, wherein the pin of the stop ring engages the groove of the turret cap. In yet another embodiment, the stop ring has a second planar surface parallel with the first planar surface and the pin extends perpendicularly from the second planar surface. In a further embodiment, the groove of the turret cap extends from 300° to 720° around the turret screw. In yet a further embodiment, the spiral groove extends from greater than 360° to 1,080° around the turret screw.

In still a further embodiment, the stop ring has a first planar surface perpendicular to the axis and the spiral groove is defined in the planar surface. In yet another embodiment, the spiral groove comprises at least two concentric arcs each centered on the screw axis and substantially encompassing the axis, the spiral groove including at least one transition portion connecting the at least two arcs. In another embodiment, the cam pin is radially movable. In yet another embodiment, the cam pin is linearly movable along at least a portion of a chord of the cam pin chassis.

In another embodiment, the disclosure provides a rifle scope. In accordance with embodiments of the disclosure, a rifle scope comprises a scope body; a movable optical element defining an optical axis connected to the scope body; a turret having a screw defining a screw axis and operably connected to the optical element for changing the optical axis in response to rotation of the screw, the turret comprising a cam pin chassis, a stop ring, and a turret cap; wherein the cam pin chassis has a central bore and securing a cam pin, wherein the screw extends through the central bore, the cam pin extends from the chassis parallel with the axis, and the cam pin is linearly moveable within the cam pin chassis; wherein the stop ring has a central bore, a first surface, and a second surface comprising a spiral groove terminating at first and second stop surfaces, wherein the screw extends through the central bore and the cam pin engages the spiral groove; wherein the turret cap has a central bore and the screw extends through the central bore such that the turret cap, stop ring, and cam pin chassis have a common rotational axis, and wherein the pin of the stop ring engages the groove.

In another embodiment, the rotational limits of the turret are defined by the first and second stop surfaces of the stop ring. In another embodiment the turret cap has a first surface having a groove terminating at first and second stop surfaces, and the first surface of the stop ring comprises a pin, wherein the pin of the stop ring engages the groove of the turret cap. In a further embodiment, the groove of the turret cap extends from 300° to 720° around the turret screw. In yet another embodiment, the rotational limits of the turret screw are defined by one of the first and second stop surfaces of the turret cap and one of the first and second stop surfaces of the stop ring. In still a further embodiment, rotation of the turret cap in a first direction causes the groove of the turret cap to move in a first direction, and responsive to the pin engaging one of the first and second stop surfaces of the groove further rotation of the turret cap in the first direction causes rotation of the stop ring in the first direction. In another embodiment, rotation of the turret cap in a second direction causes the groove of the turret cap to move in a second direction, and responsive to the pin engaging the other of the first and second stop surfaces of the groove further rotation of the turret cap in the second direction causes rotation of the stop ring in the second direction.

In an embodiment, the spiral groove extends from greater than 360° to 1,080° around the turret screw. In another embodiment, the spiral groove comprises at least two concentric arcs each centered on the screw axis and substantially encompassing the axis, the spiral groove including at least one transition portion connecting the at least two arcs. In a further embodiment, axial movement of the turret cap relative to the turret changes the turret from a locked position to an unlocked position.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings:

FIGS. 9A-E illustrate an exemplary first amount of rotation of the turret in accordance with embodiments of the present disclosure.

FIGS. 10A-C illustrate an exemplary second amount of rotation of the turret, with the turret shown in partial cross-section and the turret cap removed, in accordance with embodiments of the present disclosure.

Figure 1:
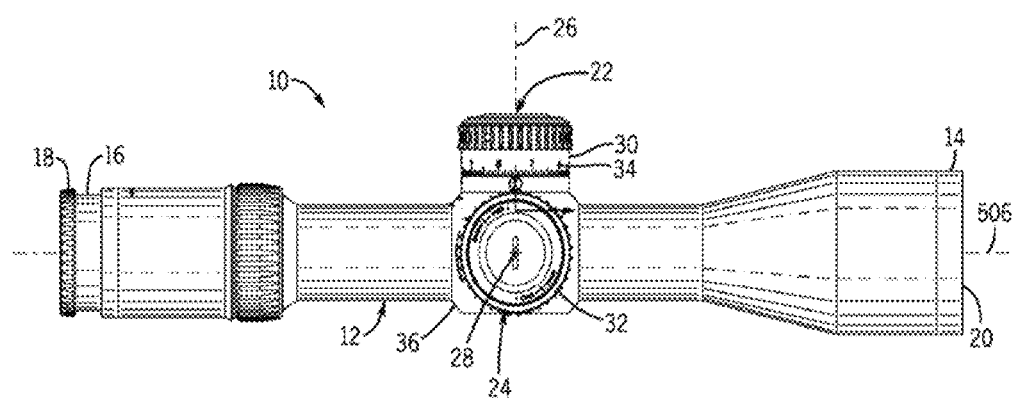
FIG. 1 illustrates an exemplary viewing optic in the form of a scope in accordance with embodiments of the present disclosure.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used herein, "ballistics" is a way to very precisely calculate the trajectory of a bullet based on a host of factors.

As used herein, "trajectory" is a bullet flight path over distance that is affected by gravity, air density, bullet shape, bullet weight, muzzle velocity, barrel twist direction, barrel twist rate, true bearing of flight path, vertical angle of muzzle, wind, and a number of other miscellaneous factors.

As used herein, a "turret" is typically a rotary dial on the riflescope. There are usually an elevation turret and windage turret. The elevation turret adjusts the crosshair vertically and the windage turret adjusts the crosshair horizontally. The elevation and windage turret, used in conjunction, can move the riflescope crosshair the proper amount to compensate for the bullet trajectory over range.

A turret typically has detent increments so that you can dial the precise amount of compensation. The turret detents are typically graduated in Minutes of Angle (MOA) or Milliradians (MRAD), which are angular units of measure that can be correlated to the amount of trajectory change in the bullet over range. Both MOA and MRAD can be used and are akin to the difference between using inches vs. centimeters to measuring distance.

As used herein, a "reticle," in one embodiment, is a crosshair aiming point for your bullet. As used herein, a "reticle" is an aiming pattern for your bullet.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. In one embodiment, the viewing optic is a riflescope. The term "viewing optic" is used interchangeably with "optic sight."

As used herein, zeroing refers to the adjustment of turrets so that crosshairs are on the intended point of bullet impact, with the turret adjusted to the "0" position at a prescribed range, usually 100 yards. As targets present themselves beyond 100 yards, a shooter would dial their turret "up" from the "0" position to compensate based off of readily known ballistic math.

As used herein, a zero stop is a mechanism that allows the user to set a mechanical stop in the turret after the rifle has been zeroed at 100 yards, or whatever distance is desired for the "zero" range. In this situation if you shoot a target at 900 yards and then a target appears suddenly at 100 yards, the user can simply dial the turret "down" until the turret mechanically stops against the zero stop. The user does not have to worry about watching the numbers on the turret, counting turns, and trying to stop at a fine click position at their original zero position. This allows the user to rely on feel only and gross motor skills rather than fine motor skills.

Figure 2:
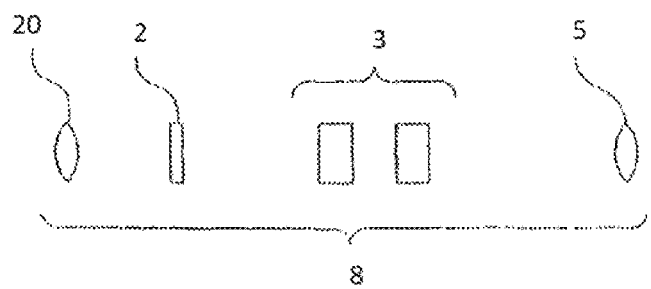
FIG. 2 illustrates various representative parts of a scope.

FIG. 1 illustrates an exemplary riflescope, and FIG. 2 illustrates various internal components of the riflescope. More particularly, the riflescope 10 has a body 12 that encloses the optical components shown generally as 8 in FIG. 2, including, as in the exemplary embodiment shown, an objective lens 20, reticle 2, variable power optical components 3, and an ocular lens 5. In the embodiment shown, one or more of the optical components are contained within a movable optical element such as an erector tube.

The scope body 12 is an elongated tube having a larger opening at its front 14 and a smaller opening at its rear 16. An eyepiece 18 is attached to the rear 16 of the scope body 12, and the objective lens 20 is attached to the front of the scope body. The center axis of optical elements 8 defines the optical axis of the scope.

An elevation turret 22 and a windage turret 24 are two dials on the outside center part of the scope body 12. They are marked in increments by indicia 34 on their perimeters 30 and 32 and are used to adjust the elevation and windage of the optical elements for points of impact change. These turrets protrude from the turret housing 36. The turrets are arranged so that the elevation turret rotation axis 26 is perpendicular to the windage turret rotation axis 28. Indicia typically include tick marks, each corresponding to a click, and larger tick marks at selected intervals, as well as numerals indicating angle of adjustment or distance for bullet drop compensation.

The optical elements are adjusted by rotating the turrets one or more clicks. A click is one tactile adjustment increment on the windage or elevation turret of the rifle scope, each of which corresponds to one of the indicia 34. In one embodiment, one click changes the scope's point of impact by 0.1 MRAD. In another embodiment, one click changes a scope's point of impact by ¼ inch at 100 yards. In other embodiments, a click may take other values, such as ½ inch, other OA milliradian, etc. As used herein, a Minute of Angle (MOA) is a unit of measurement of a circle, which is 1.0472 inches at 100 yards. Conventionally, it is referred to as being 1 inch at 100 yards, 2 inches at 200 yards, 5 inches at 500 yards, ½ inch at 50 yards, etc.

Figure 3:
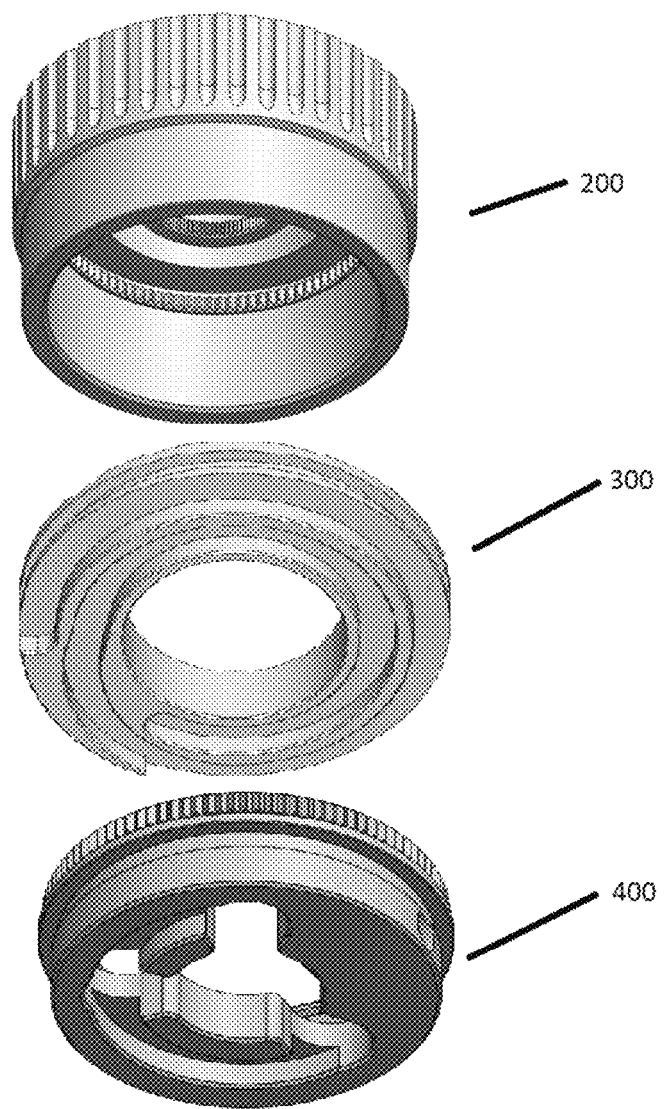
FIG. 3 is an exploded view of a turret in accordance with embodiments of the present disclosure.

FIG. 3 is an exploded view of an exemplary turret 200. The turret 200 is a cylindrical body composed of a turret cap 300, a zero-stop ring 400, a cam pin chassis 500. The turret cap 300, zero-stop ring 400 and cam pin chassis 500 each have a central bore 320, 420, 520 that are coaxial and have a diameter just larger than that of a turret screw 600 (not shown) such that the turret cap 300, stop ring 400 and cam pin chassis 500 are rotationally free about the turret screw 600. The rotational axes of the turret cap 300, zero-stop ring 400, cam pin chassis 500, and turret screw 600 are therefore colinear.

Figure 4A:
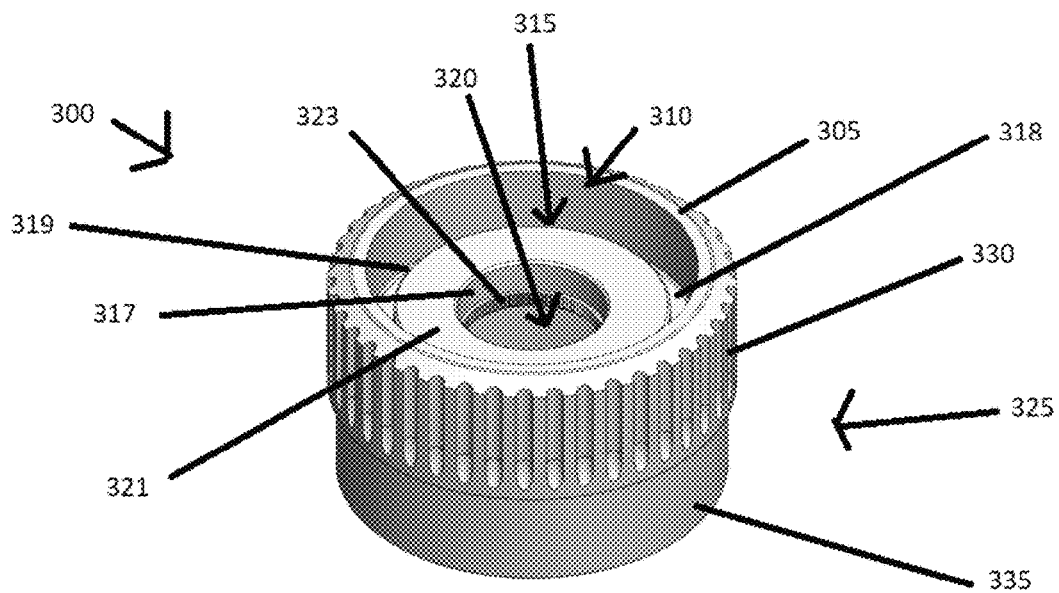
FIG. 4A is an upper perspective view of a turret cap in accordance with embodiments of the present disclosure.
Figure 4B:
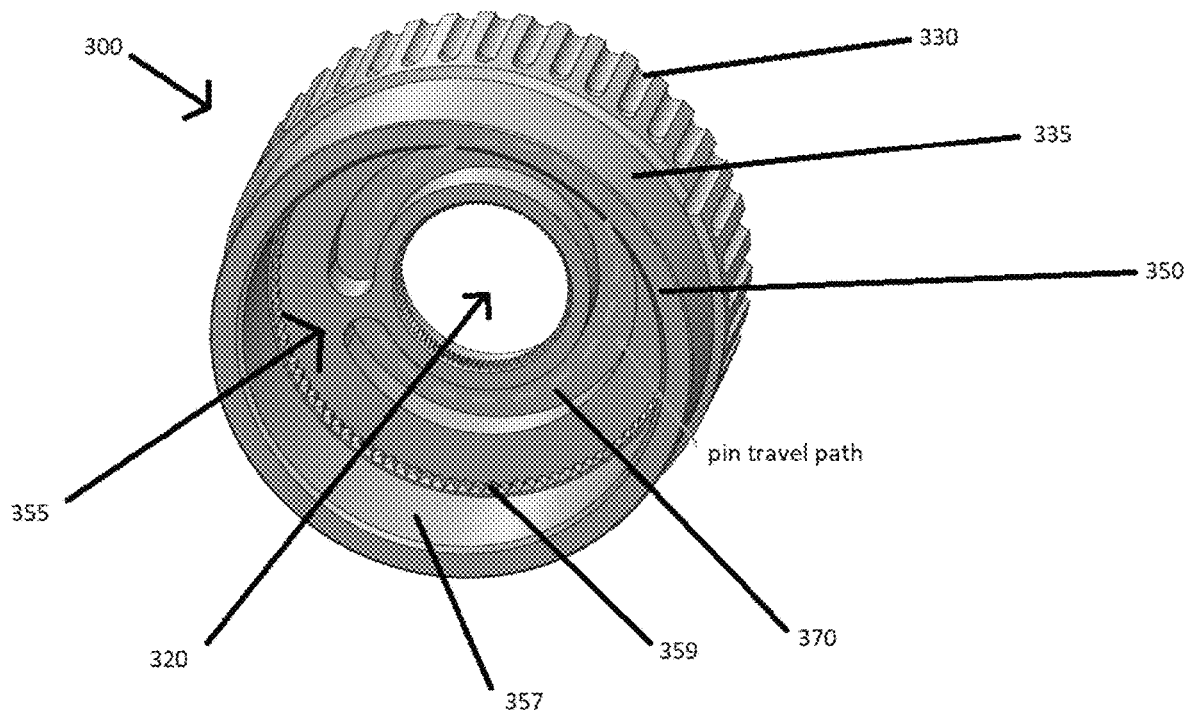
FIG. 4B is a bottom perspective view of a turret cap in accordance with embodiments of the present disclosure.
Figure 4C:
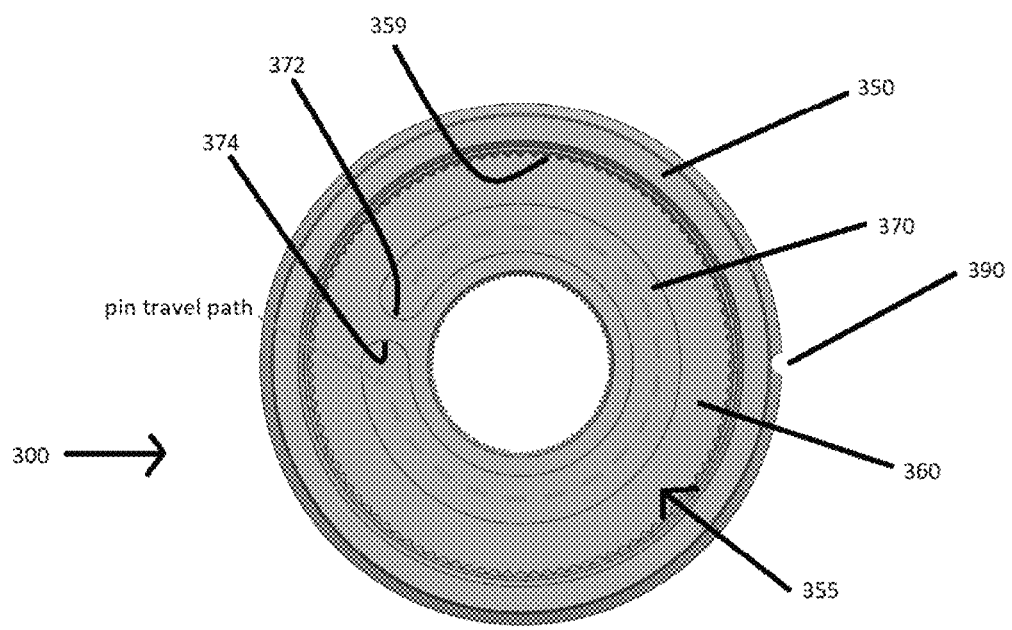
FIG. 4C is a bottom view of a turret cap in accordance with embodiments of the present disclosure.

FIGS. 4A-4C illustrate the turret cap 300 in further detail. In particular, the turret cap 300 is shown with the top cap 301 removed. The top 305 of the turret cap 300 defines a recess 310 having a center portion 315 and a groove portion 318. The center portion 315 is raised above the groove portion 318 but does not extend as high as the top 305. The center portion 315 also defines a central bore 320. The central bore 320, center portion 315 and groove portion 318 are coaxial.

The inner surface of the recess 310 and the floor of the groove portion 318 are smooth, as are the inner vertical surface 317, inner vertical surface 319 and upper surface 321 of the raised center portion 315. The lower edge 323 of the central bore 320 is toothed.

The outer surface 325 of the turret cap 300 has an upper tactile portion 330 and a lower smooth portion 335. The upper tactile portion 330 is textured for a user's convenience and to provide tactile feedback when using the turret 200 in low lighting or otherwise without looking.

With reference to FIGS. 4B and 4C in particular, the bottom 350 of the turret cap 300 defines a recess 355 having a generally flat surface 360 with a groove 370. The central bore 320 extends through the recess 355 creating a passage through the turret cap 300. The side wall 358 of the recess 355 is approximately perpendicular to the flat surface 360 and has a smooth portion 357 and a toothed portion 359. A notch 390 is provided through the upper tactile portion 330 of the outer surface 325, with the notch 390 extending beyond the other tactile features of the upper tactile portion 330.

The groove 370 is recessed into the flat surface 360 of the recess 355 and is radially positioned between the bore 320 and the side wall 358. The groove 370 is generally circular with the terminated ends 372, 374 closed to not complete the circle. In the embodiment shown, the groove 370 has a consistent radius and the terminated ends 372, 374 are adjacent one another. However, in further embodiments, the terminated ends 372, 374 may be offset (e.g., the groove 370 has an inconsistent radius).

In the embodiment shown, the groove 370 goes approximately 330° around the turret cap's 300 bottom surface 360. In further embodiments, the groove 370 goes from 300°, or 310°, or 320°, or 330° to 335°, or 340°, or 345°, or 350°, or 355°, or 360°, or 450°, or 540°, or 630°, or 720°. In yet a further embodiment, the groove 370 goes from 300°, or 310°, or 320°, or 330° to 335°, or 340°, or 345°, or 350°, or 355°, or 360°.

Figure 5A:
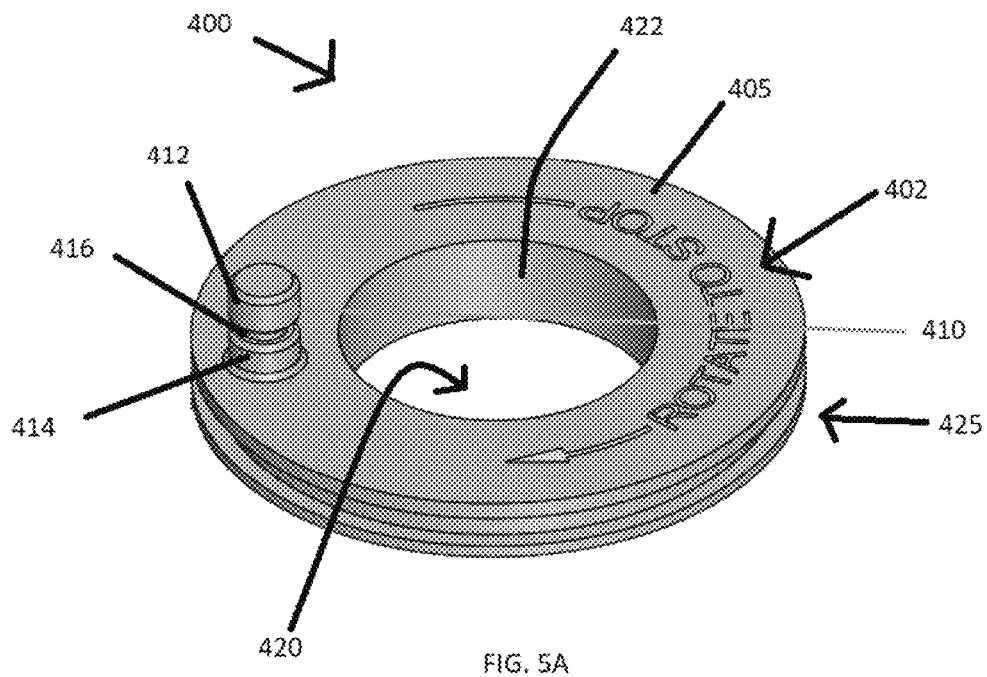
FIG. 5A is an upper perspective view of a zero-stop ring in accordance with embodiments of the present disclosure.
Figure 5B:
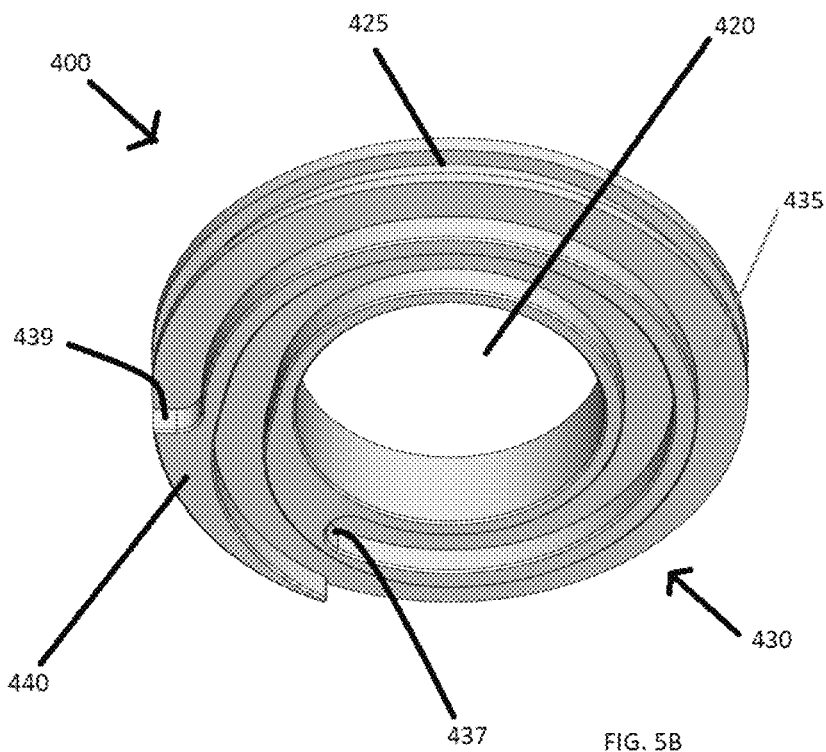
FIG. 5B is a bottom perspective view of a zero-stop ring in accordance with embodiments of the present disclosure.
Figure 5C:
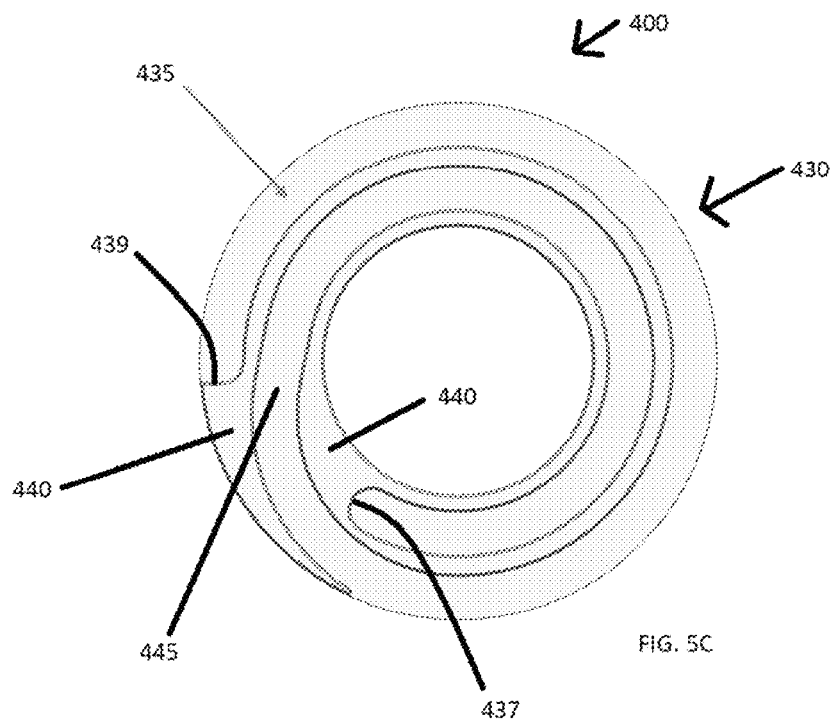
FIG. 5C is a bottom view of a zero-stop ring in accordance with embodiments of the present disclosure.

FIGS. 5A-5C illustrate the stop ring 400. The top 402 of the ring 400 has a smooth upper surface 405 defining a central bore 420 with a smooth inner surface 422. In the embodiment shown, the upper surface 405 is a generally planar surface that is perpendicular to the rotation axis/screw axis. The outer surface of the ring 400 has a channel 425 around its circumference. A pin 410 extends upward from the upper surface 405. In the exemplary embodiment shown, the pin 410 extends perpendicularly from the surface 405 parallel with the rotation axis/screw axis. The pin 410 has an upper portion 412 and a lower portion 414 separated by a groove 416. The upper portion 412 of the pin 410 interfaces with the groove 370 on the bottom 350 of the turret cap 300. That is, the width of the groove 370 is just larger than the head 412 of the pin 410 so that the pin 410 can easily slide within the groove 370.

Figure 5D:
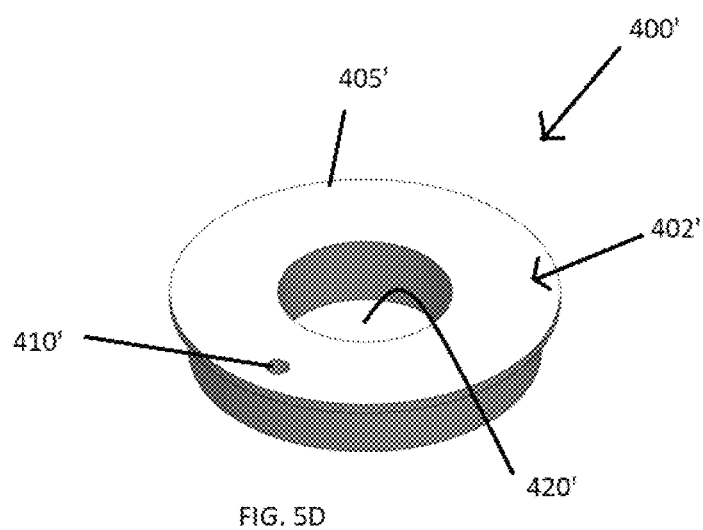
FIG. 5D is an upper perspective view of a further embodiment of a zero-stop ring in accordance with embodiments of the present disclosure.
Figure 5E:
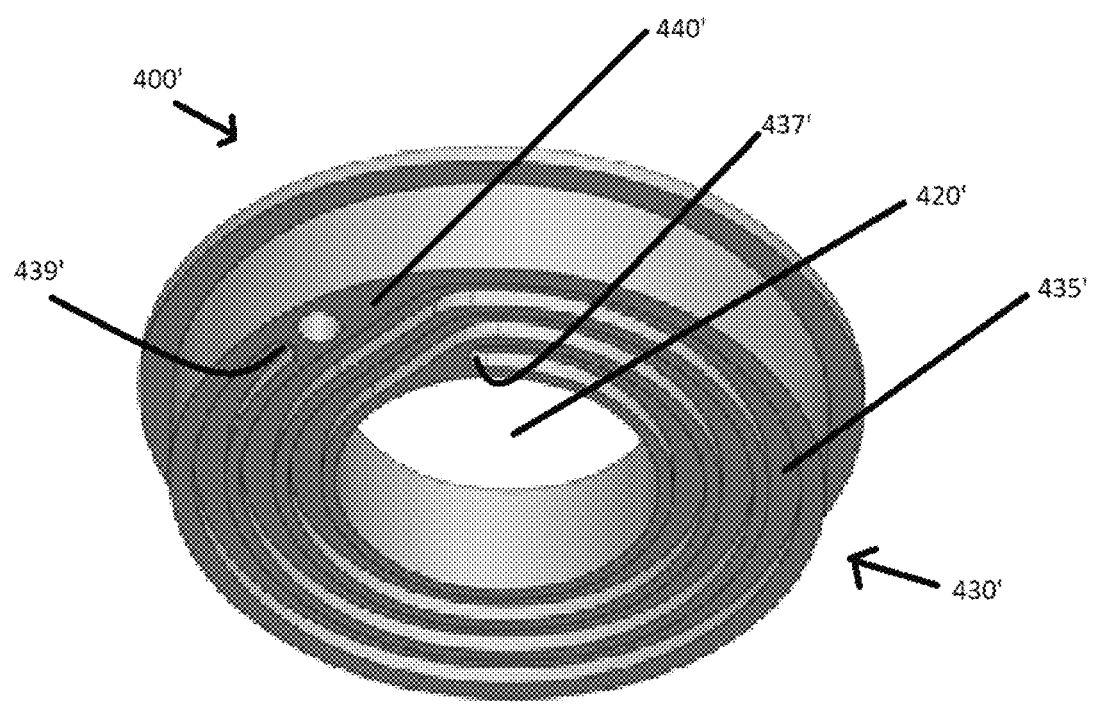
FIG. 5E is a bottom perspective view of a further embodiment of a zero-stop ring in accordance with embodiments of the present disclosure.

The bottom 430 has a generally flat surface 440 with a spiral groove 435. In the particular embodiment shown, the flat surface 440 is a generally planar surface, which is perpendicular to the rotation axis/screw axis. The flat surface 440 is parallel with surface 405. The spiral groove 435 is defined in the planar surface and has terminal ends 437, 439. The terminal ends 437, 439 are function as stop surface, as will be explained in further detail below. In the embodiment shown, the spiral groove 435 overlaps itself at transition 445 to allow for the spiral groove 435 to proceed greater than 360° about the stop ring 400. That is, the spiral groove 435 has an inconsistent radius. In other words, the spiral groove 435 is shown composed of two concentric arcs, each centered around the rotational axis/screw axis and essentially encompassing the axis. The transition portion 445 connects the two arcs. In further embodiments, the spiral groove may be made of more than two arcs and more than one transition portion, such as shown in FIGS. 5D-5E.

In the embodiment shown, the spiral groove 435 extends approximately 660° about the stop ring 400. In further embodiments, the spiral groove 435 extends from greater than 360°, or 450°, or 540°, or 630° to 660°, or 680°, or 700°, or 710°, or 720°, or 810°, or 900°, or 990°, 1020°, or 1,080°. In yet a further embodiment, the spiral groove 435 extends from greater than 360°, or 450°, or 540°, or 630° to 660°, or 680°, or 700°, or 710°, or 720°.

In combination, the stop ring 400 and turret cap 300 permit a total rotational limit from 660°, or 705°, or 750°, or 795°, or 840° to 885°, or 930°, or 975°, or 1,020°, or 1,065°, or 1,080°, or 1,170°, or 1,260°, or 1,350°, or 1,440°.

The top 402 and bottom 430 are separated by a groove around the circumference of the zero-stop ring 400.

With further reference to FIGS. 5D and 5E, in some embodiments, the stop ring 400' is designed to be the sole component containing spiral grooves. That is, in an embodiment, the turret cap 300 is free of grooves (such as, for example, the groove 370 as shown in FIGS. 4B and 4C). In such an embodiment, the spiral groove 435' extends approximately 1,020° about the stop ring 400'. In further embodiments, when no groove is provided in the turret cap 300, the spiral groove 435' extends from greater than 660°, or 680°, or 700°, or 710°, or 720°, or 810°, or 900°, or 990°, or 1020°, or 1,080°. Further, in such embodiments in which the turret cap 300 is free of grooves, the stop ring 400' does not contain a pin on its upper surface. In the particular embodiment shown, an opening 410' is provided. A securing structure may engage the opening 410' to secure the stop ring 400' to the turret cap 300.

FIGS. 6A-6F show an embodiment of a cam pin chassis 500. The cam pin chassis 500 is cylindrical with a top 502 that defines a recess 504. The recess 504 has a smooth surface 506 and a smooth side wall 504. A notch 510 is positioned on an inner perimeter of the top 502. The outer side wall 525 of the cam pin chassis 500 has a toothed portion 526 and a smooth portion 527. A groove 535 extends around the circumference of the outer side wall 525 to separate the toothed portion 526 and the smooth portion 527.

A central bore 520 extends through the surface 506. In the embodiment shown, the central bore 520 has three lobes 521a, 521b, 521c connected to and extending from the central bore 520. An opening 523 in the smooth portion 527 of the outer side wall 525 opens to a slot 522 passing through the surface 506. The slot 522 opens to the central bore 520 through the smooth side wall 530 of the central bore 520 at a location between two of the lobes, 521b and 521c in the embodiment shown. The upper portion of the slot 522 is open through the smooth surface 530.

Figure 6A:
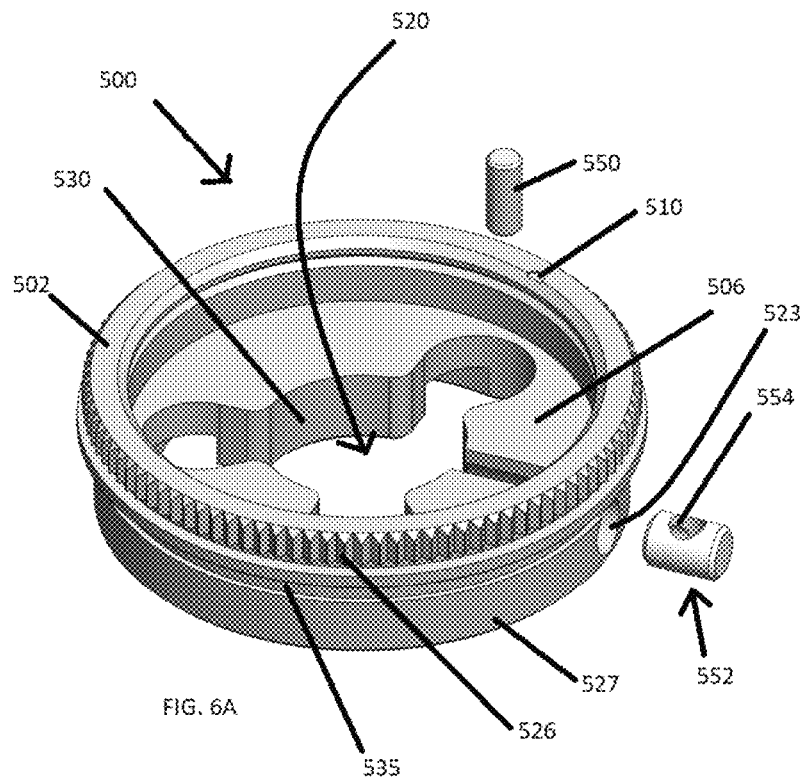
FIG. 6A is an upper perspective exploded view of a cam pin chassis in accordance with embodiments of the present disclosure.
Figure 6B:
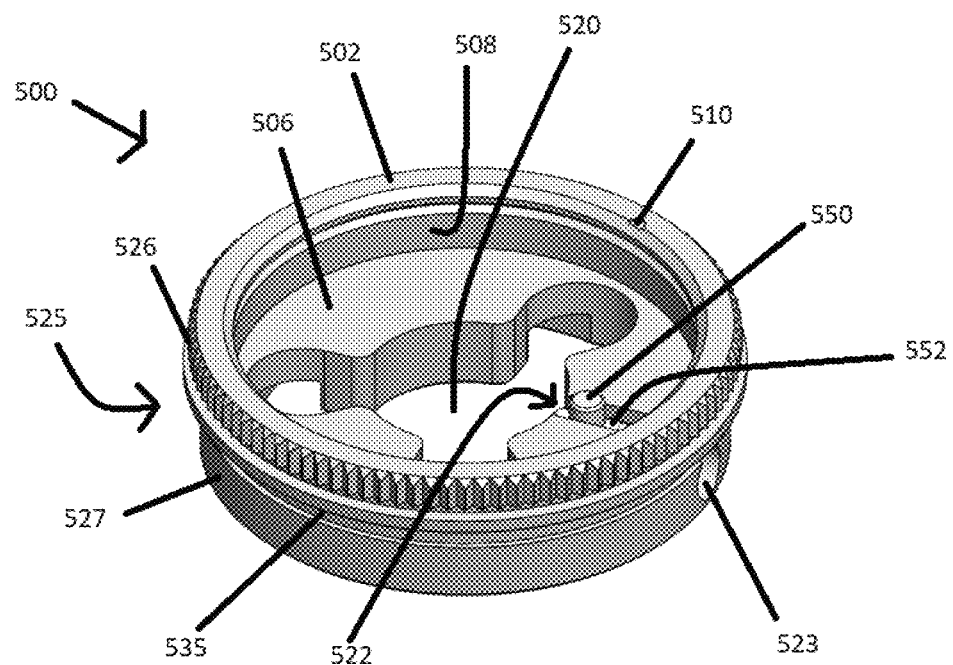
FIG. 6B is an upper perspective view of a cam pin chassis in accordance with embodiments of the present disclosure.
Figure 6C:
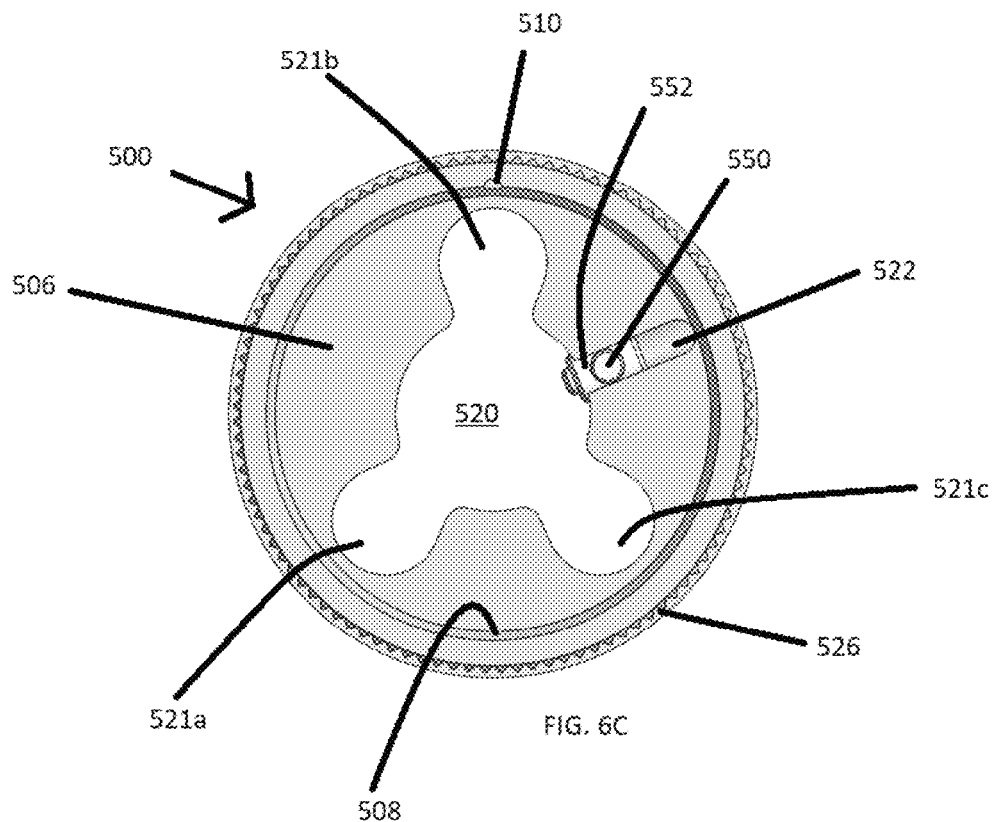
FIG. 6C is an upper view of a cam pin chassis in accordance with embodiments of the present disclosure.
Figure 6D:
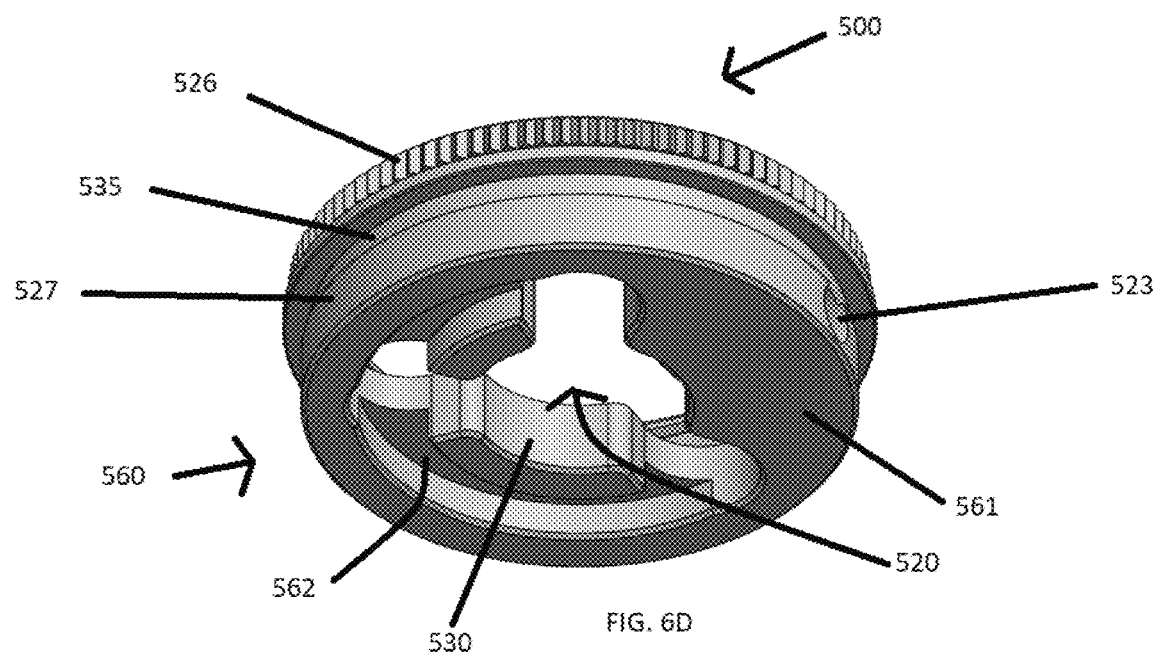
FIG. 6D is a bottom perspective of a cam pin chassis in accordance with embodiments of the present disclosure.
Figure 6E:
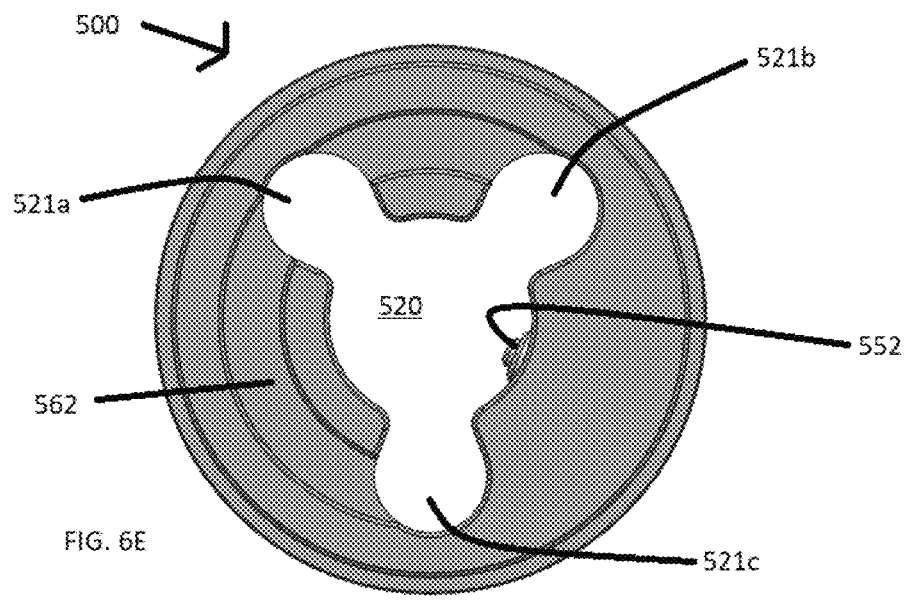
FIG. 6E is a bottom view of a cam pin chassis in accordance with embodiments of the present disclosure.
Figure 6F:
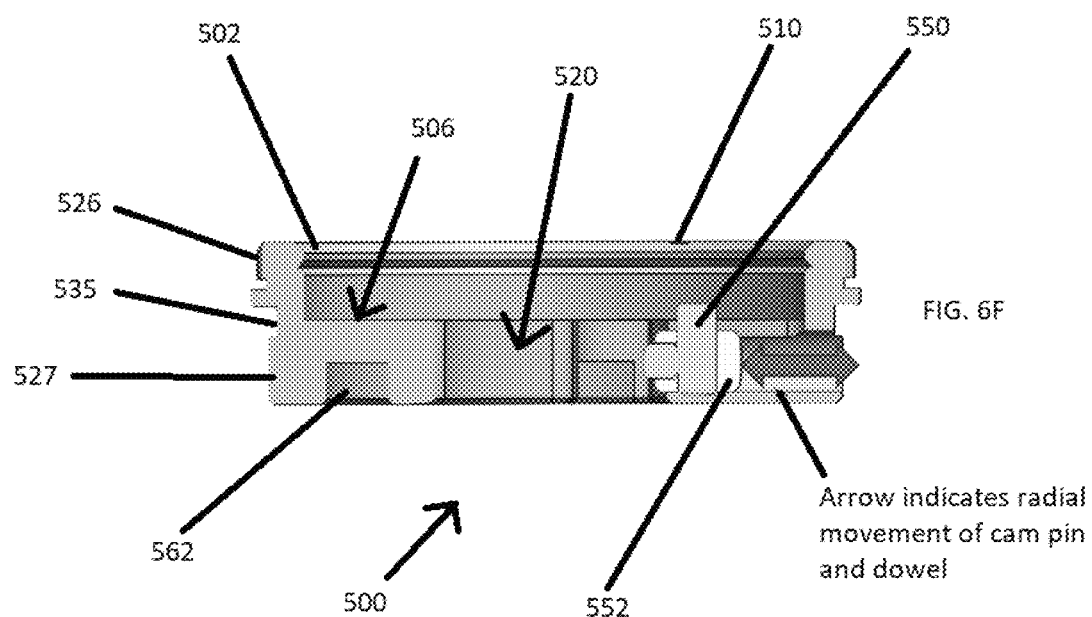
FIG. 6F is a cross-sectional view of a cam pin chassis in accordance with embodiments of the present disclosure.

A dowel 552 is slidable within the slot 522. The dowel 552 has an opening 554 in which the cam pin 550 is located. The cam pin 550 is cylindrical and has a diameter just less than that of the width of the spiral groove 435 of the zero-stop ring 400. The opening 554 in the dowel 552 is just larger than the diameter of the cam pin 550. The slot 522 and opening 523 have a diameter just larger than that of the dowel 552. The slot 522 extends radially from the axis of the turret screw (not shown). This arrangement allows for radial movement of the cam pin 550, as shown in FIG. 6F. When the cam pin 550 engages the spiral groove 435, the cam pin 550 can track along the spiral groove 435 as it extends radially outward or inward depending on the direction of travel.

The bottom 560 of the cam pin chassis 500 is a generally smooth surface 561 with a channel 562 extending less than 360° about the cam pin chassis 500. In the embodiment shown, the channel 562 intersects with each of the three lobes 521a, 521b, 521c but does not intersect the hole 523/slot 522 area. As shown with respect to FIG. 7B, the lobes 521a, 521b, 521c and channel 562 engage and interact with other portions of the turret to accomplish its functionality.

Figure 6G:
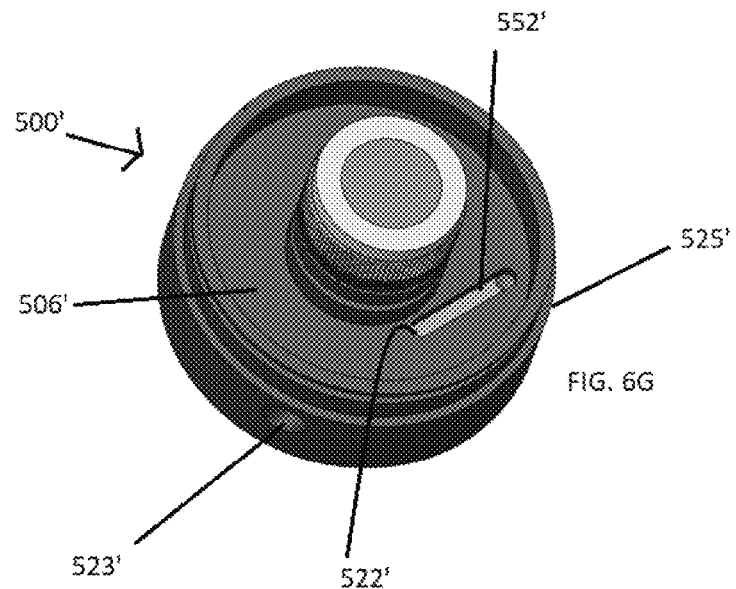
FIG. 6G is a bottom perspective view of a further embodiment of a cam pin chassis in a first position in accordance with embodiments of the present disclosure.
Figure 6H:
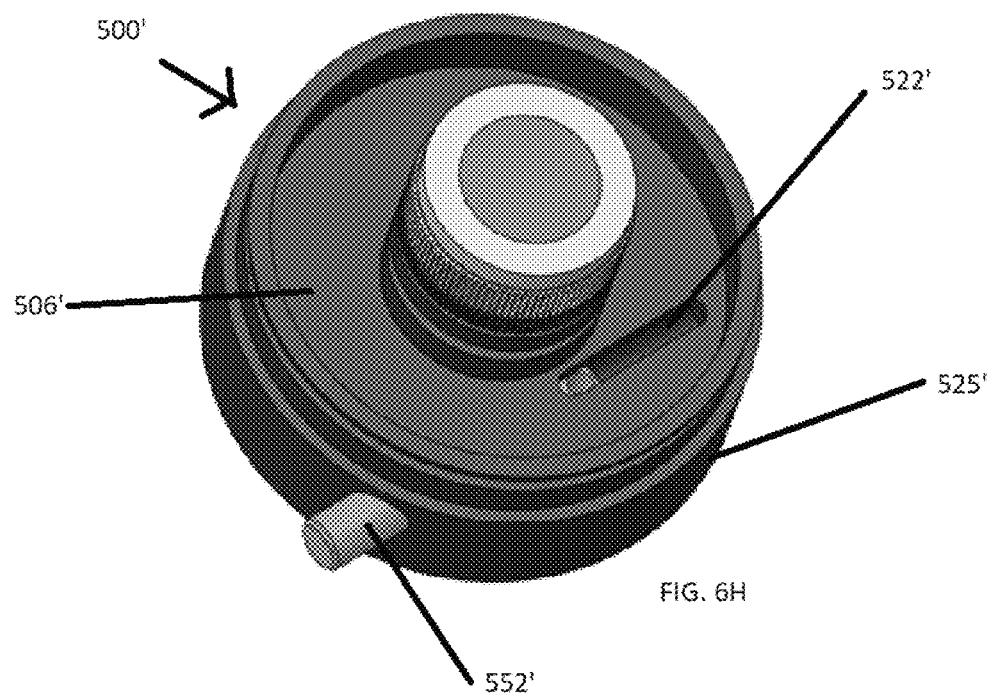
FIG. 6H shows the cam pin chassis of FIG. 6G in a second position.

In other embodiments, such as shown in FIGS. 6G and 6H, a cam pin chassis 500' may be configured such that cam pin moves other than radially with respect to the cam pin chassis 500'.

As shown in FIGS. 6G and 6H, a central bore (shown with the turret screw engaged) extends through the center of the cam pin chassis 500'. Unlike cam pin chassis 500, the central bore does not have three lobes. Rather, the central bore is a single round bore. This design provides for increased surface over which a cam pin (not shown) can travel. An opening 523' in the outer side wall 525' opens to a slot 522' passing through the surface 506'.

A dowel 552' is slidable within the slot 522', as shown in FIGS. 6G and 6H. The dowel 552' has an opening 554' in which the cam pin (not shown) is to be located. While the slot 522 of cam pin chassis 500 extends radially from the axis of the turret screw, the slot 522' of the cam pin chassis 500' extends linearly across a portion of a chord of the circular cam pin chassis 500'. By using a chord of the cam pin chassis 500', the dowel 552' and cam pin (not shown) can travel a distance greater than that of the radius and allow for additional rotations of the spiral groove of the stop ring about the axis. For example, in FIG. 6G, the dowel 552' is shown fully against the far right of the slot 522' (in the orientation shown), and in FIG. 6H the dowel 552' is shown extending from the opening 523'.

Figure 7A:
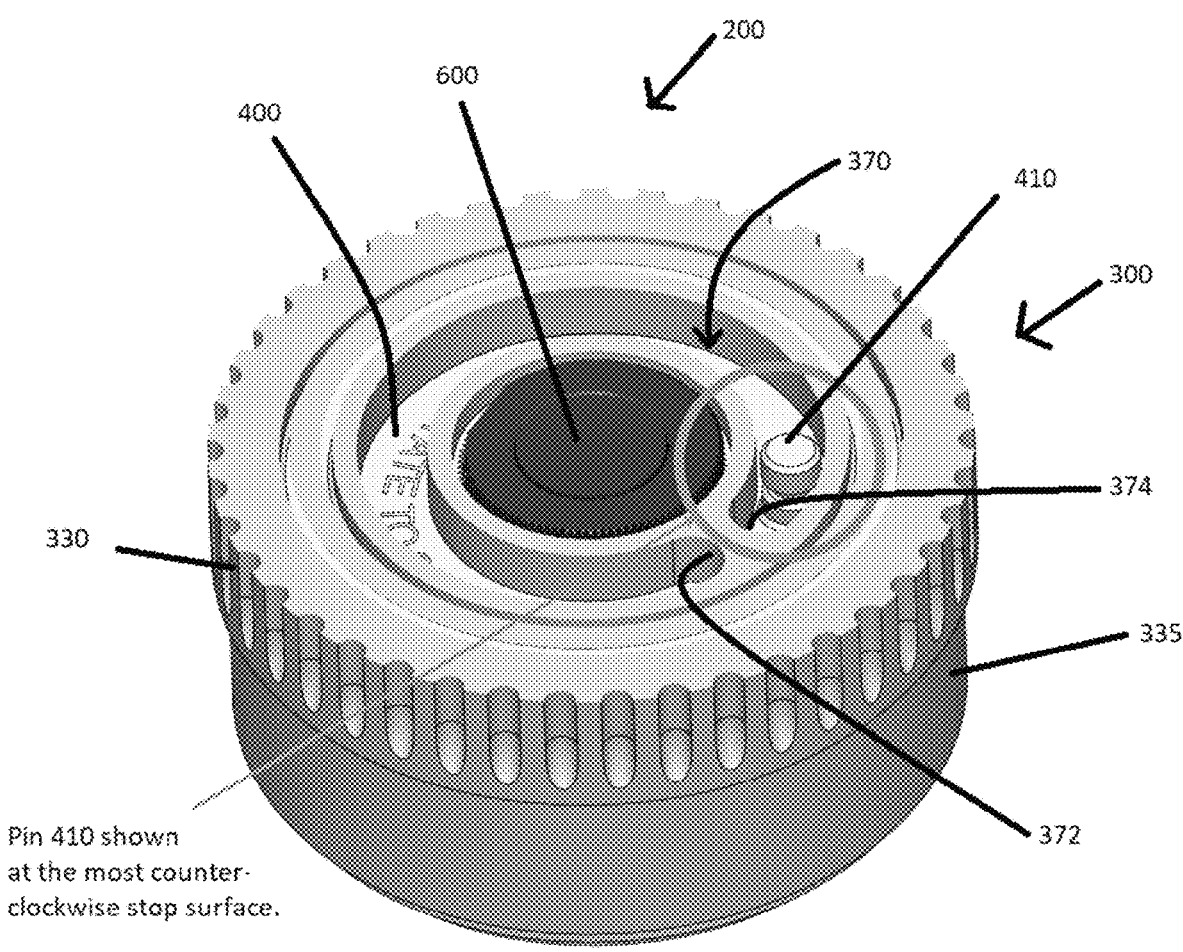
FIG. 7A is an upper perspective view of the assembled turret with an upper portion of the turret cap removed in accordance with embodiments of the present disclosure.
Figure 7B:
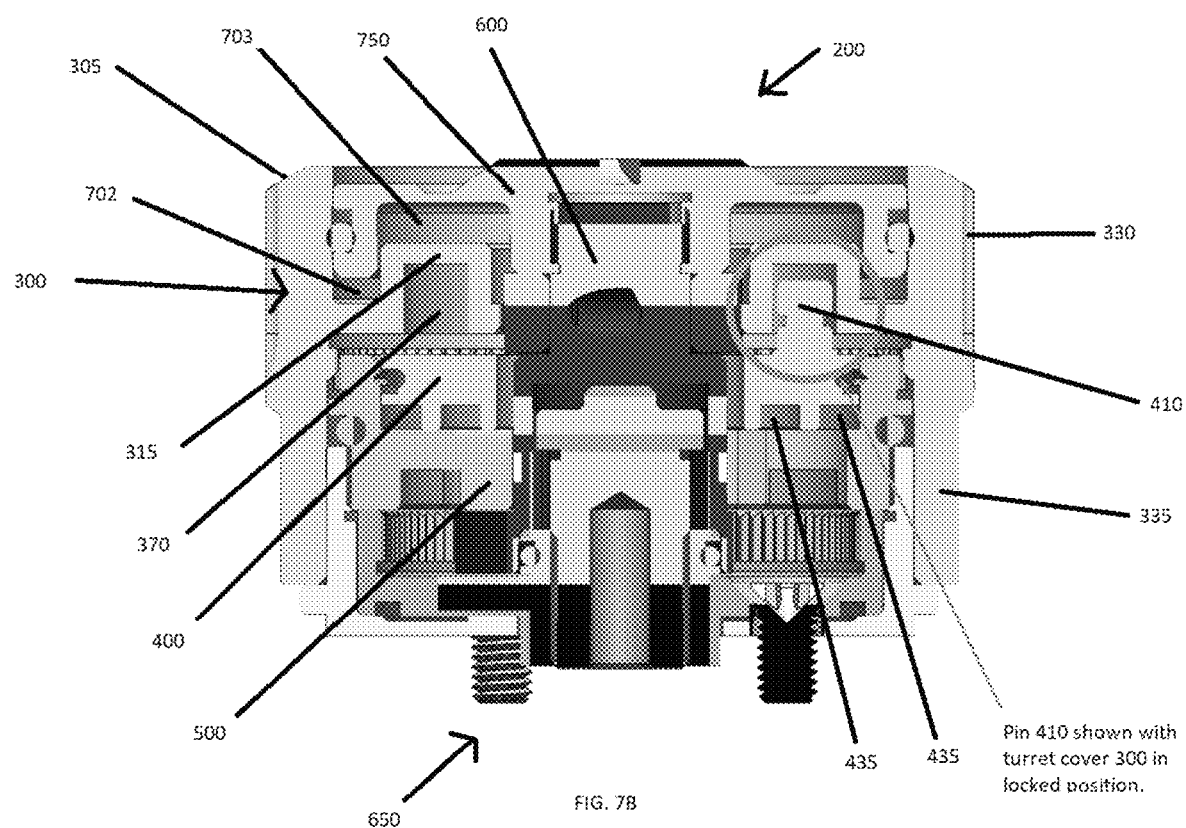
FIG. 7B is a cross-sectional view of an assembled turret of FIG. 7A.

FIGS. 7A-7B illustrate the function of the zero-stop channel 370 of the turret cap 300. The cam pin chassis 500 and stop ring 400 are shown installed around the turret screw 600 with the turret cap 300 secured over the cam pin chassis 500 and stop ring 400 to complete the turret 200. The remaining components of the turret 200 that contribute to its functionality (e.g., adjustment of the optical elements) are referred to, generally, with numeral 650. The pin 410 engages the groove 370, which, as shown in FIG. 7B, protrudes into the raised center portion 315. Rotation of the turret cap 300 results in movement of the groove 370 relative to the pin 410 until the pin engages a stop surface 372, 374.

The depth of the groove 370 and height of the pin 410 allow for a space 700 between the end of the pin 410 and the upper surface of the groove 370. The view in FIG. 7B also shows the turret cap cover 750 installed. The cover 750 is secured to the turret screw 600. The cover 750 is positioned such that spaces 702, 703 are provided between the cover 750 and the turret cap 300. The spaces 700, 702, 703 permit limited axial movement of the turret cap 300. This axial movement allows for locking/unlocking of the turret 200. That is, as shown in FIG. 7B, the turret is in its locked position and the turret cap 300 is not rotationally free. Lifting the turret cap 300 until axial movement is stopped by the cover 750 unlocks the turret 200, meaning the turret cap 300 is rotationally free.

Figure 8:
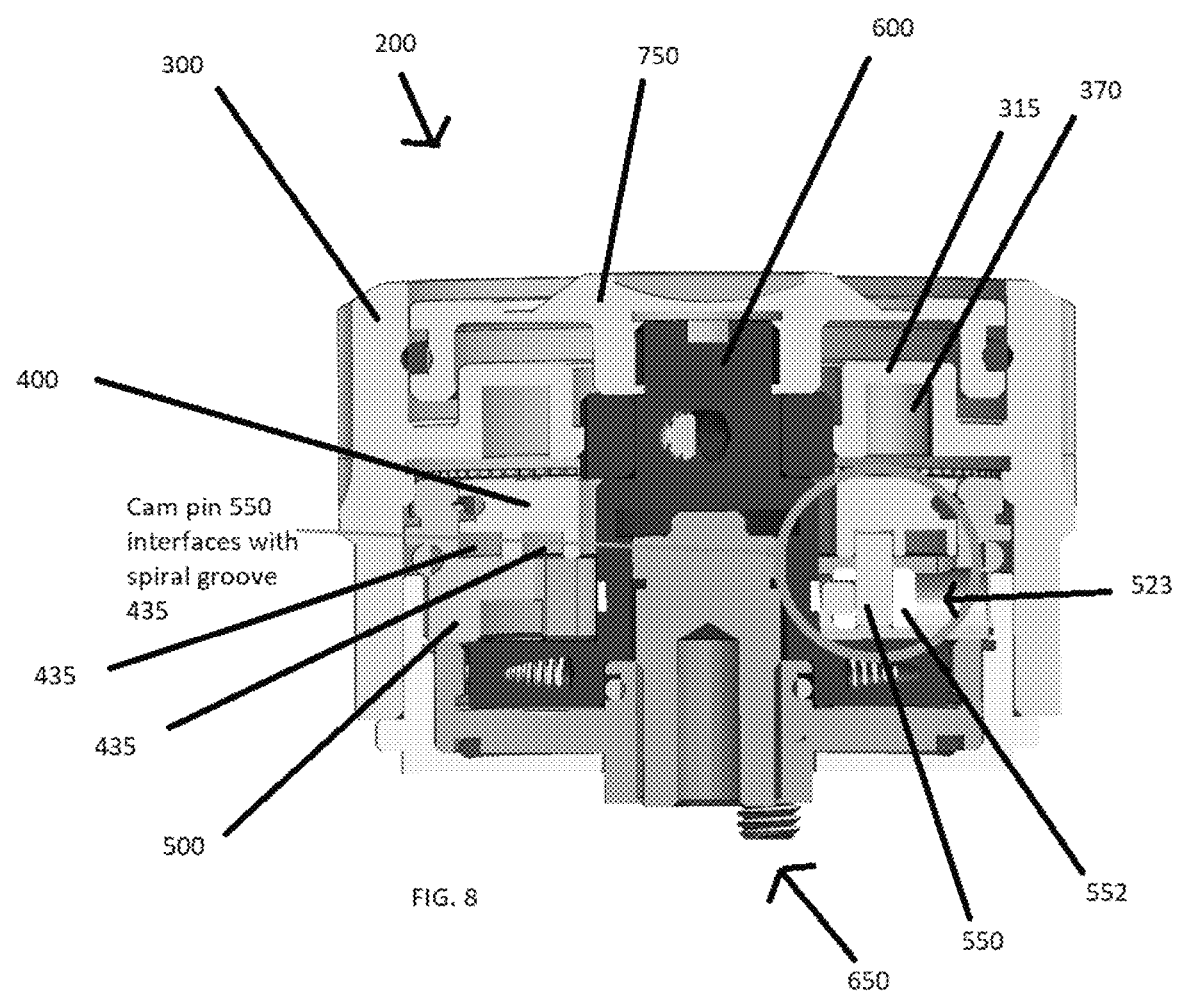
FIG. 8 is a further cross-sectional view of an assembled turret in accordance with embodiments of the present disclosure.

FIG. 8 is a cross-sectional view of the assembled turret of FIG. 7A, but cut at a different position such that the cam pin 550 is shown engaging the spiral groove 435 of the stop ring 400. As shown in FIG. 8, the cam pin 550 is shown engaging the innermost portion of the spiral groove 435 through the slot, with the dowel 552 radially inward in the hole 523.

To zero a riflescope (or other viewing optic), the user removes the turret cap 300 and then the stop ring 400 from the turret 200. The turret cap 300 is replaced (with the stop ring 400 omitted). The riflescope can then be zeroed without interference from a mechanical stop. Because the turret cap 300 is mechanically coupled to the turret screw 600, rotation of the turret cap 300 causes rotation of the turret screw 600, which translates to adjust the reticle. Rotation of the turret cap 300 therefore adjusts the reticle linearly closer or further from the turret 200. Once the riflescope is zeroed, the turret cap 300 is removed and the stop ring 400 replaced. The stop ring 400 is rotated clockwise until the cam pin 550 makes contact with the innermost stop surface 437 of the spiral groove 435. For the embodiment shown, this is the starting position for the stop ring 400.

Once the stop ring 400 is properly positioned, the turret cap 300 is replaced. The turret cap 300 is specifically aligned on the turret 200 such that its "0" indicium (or other desired indicium) is vertically aligned with a fixed indicium on the turret base or riflescope body. When so properly oriented, the pin 410 on the stop ring 400 is positioned in the channel 370 in the most counterclockwise position possible, that is, against stop surface 374 in the embodiment shown.

Initial rotation of the turret cap 300 in the counterclockwise direction to accomplish a first rotation of adjustment is shown in FIGS. 9A-9E. When a user intends to shoot at a target at an extended range, the turret cap 300 is lighted until stopped by the turret cover 750 to unlock the turret 200. When properly zeroed, initial rotation of the turret cap 300 in the clockwise direction is restricted by the engagement of the pin 410 of the stop ring 400 with stop surface 347 of the channel 370 of the turret cap 300, as shown in FIG. 9A. As the turret cap 300 is rotated counterclockwise, as shown in FIGS. 9B-9E, the channel 370 moves relative to the pin 410 (i.e., the pin 410 and therefore stop ring 400 remain stationary) to accomplish a first amount of rotation until the pin 410 engages stop surface 372. In the embodiment shown, that is approximately 330° of revolution. After engaging the stop surface 372, further counterclockwise rotation of the turret cap 300 will cause rotation of the stop ring 400 as well.

FIGS. 10A-10C illustrate a second rotation of adjustment. As the turret cap 300 continues to rotate in the counterclockwise direction past the point shown in FIG. 9E, the stop ring 400 is rotated along with the turret cap 300. As the stop ring 400 rotates, the cam pin 550 slides through the spiral groove 435 of the stop ring 400 from the innermost stop surface 437 and through the transition 445, as shown in FIG. 10C. As the cam pin 550 slides in the spiral groove 435, the dowel 552 moves axially in the slot 522. In the embodiment shown, this second rotation of adjustment is approximately 330°, resulting in an approximate total of 660° of rotation to this point.

Figure 11B:
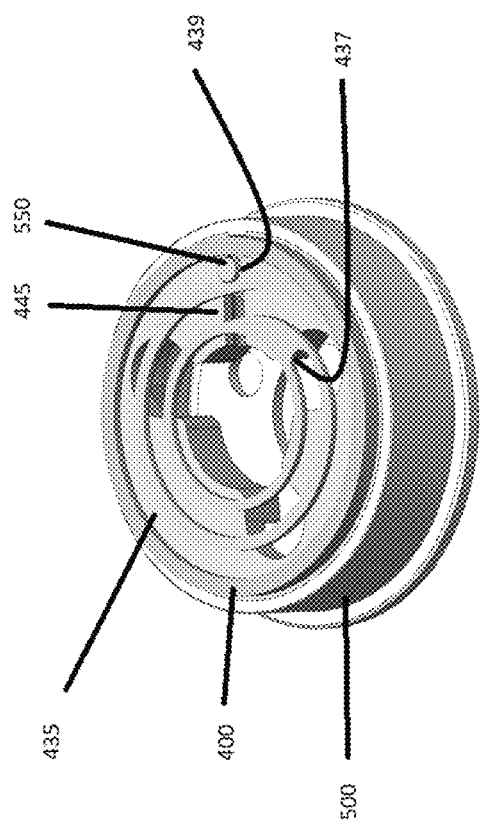
FIGS. 11A-B illustrate an exemplary third amount of rotation of the turret, with the turret shown in partial cross-section and the turret cap removed, in accordance with embodiments of the present disclosure.
Figure 11A:
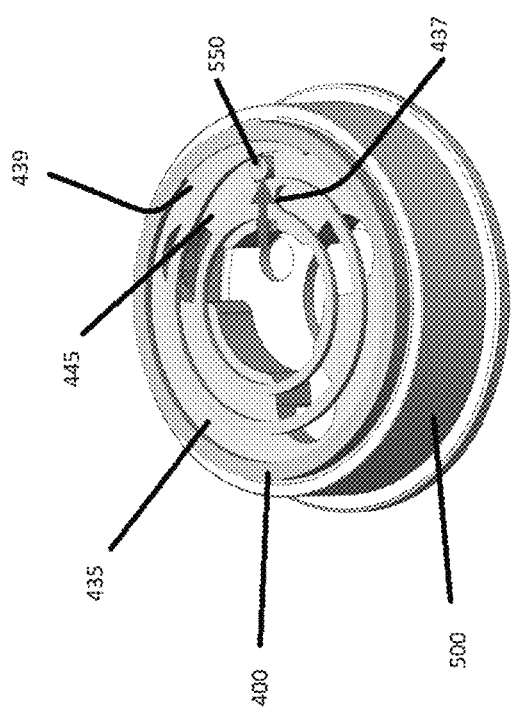

As the turret cap 300 is rotated further in the counterclockwise direction, the cam pin 550 continues to travel in the spiral groove 435 past the transition 445 and to the stop surface 439 (that is, the outermost stop surface in the embodiment shown), as shown in FIG. 11A-11B. Further counterclockwise rotation beyond that point is prevented by the stop surface 439, and the turret cap 300 has rotated an additional approximately 330°, or approximately 990° total or approximately 3 total revolutions.

Once the riflescope is properly adjusted anywhere along the adjustment continuum provided by the turret 200, the turret cap 300 is pushed downward into its locked position, and the user can set up and aim to take a shot. To return to zero, the turret cap 300 is moved upward to the unlocked position and rotated in the clockwise direction. Initial rotation of the turret cap 300 moves the channel 370 relative to the pin 410, and that movement is continued until the pin 410 of the zero-stop ring 400 engages the stop surface 347 of the channel 370. If the turret 200 was adjusted such that, in the embodiment shown, a second or third rotation was used, the user continues rotating the turret cap 300 clockwise to push the cam pin 550 back through the spiral groove 435 until it reaches the end of its travel, that is, until it reaches the innermost stop surface 437. Once clockwise rotation of the turret cap 300 is prevent, the turret is back in its starting zero position.

Although FIGS. 7A-11B are described as using turret cap 300, zero-stop ring 400 and cam pin chassis 500, it will be appreciated that stop ring 400' and/or cam pin chassis 500' may be used in place of zero-stop ring 400 and/or cam pin chassis 500, respectively, with minor design changes to the remaining components.

While multiple embodiments of the turret and riflescope with zero stop features have been described in detail, it should be apparent that modifications and variations thereto are possible, all of which fall within the true spirit and scope of the invention. With respect to the above description then, it is to be realized that the optimum dimensional relationships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A turret having screw defining an axis, the turret comprising:
a cam pin chassis having a central bore and securing a cam pin, wherein the screw extends through the central bore, the cam pin extends from the chassis parallel with the axis, and the cam pin is linearly moveable within the cam pin chassis;
a stop ring having a central bore, a first surface, and a second surface comprising a spiral groove terminating at first and second stop surfaces, wherein the screw extends through the central bore and the cam pin engages the spiral groove; and
a turret cap having a central bore, wherein the screw extends through the central bore such that the turret cap, stop ring, and cam pin chassis have a common rotational axis, wherein the turret cap has a first surface having a groove terminating at first and second stop surfaces and the first surface of the stop ring comprises a pin, wherein the pin of the stop ring engages the groove of the turret cap;
wherein a rotational limit of the turret is defined by one of the first and second stop surfaces of the stop ring.

2. The turret of claim 1, wherein the stop ring has a second planar surface parallel with the first planar surface and the pin extends perpendicularly from the second planar surface.

3. The turret of claim 1, wherein the groove of the turret cap extends from 300° to 720° around the turret screw.

4. The turret of any of claim 1, wherein the spiral groove extends from greater than 360° to 1,080° around the turret screw.

5. The turret of any of claim 1, wherein the stop ring has a first planar surface perpendicular to the axis and the spiral groove is defined in the planar surface.

6. The turret of claim 1, wherein the spiral groove comprises at least two concentric arcs each centered on the screw axis and substantially encompassing the axis, the spiral groove including at least one transition portion connecting the at least two arcs.

7. The turret of claim 1, wherein the cam pin is radially moveable.

8. The turret of claim 1, wherein the cam pin is linearly moveable along at least a portion of a chord of the cam pin chassis.

9. A rifle scope comprising a turret in accordance with claim 2.

10. A rifle scope comprising:
a scope body;
a movable optical element defining an optical axis connected to the scope body;

a turret having a screw defining a screw axis and operably connected to the optical element for changing the optical axis in response to rotation of the screw, the turret comprising a cam pin chassis, a stop ring, and a turret cap;

wherein the cam pin chassis has a central bore and securing a cam pin, wherein the screw extends through the central bore, the cam pin extends from the chassis parallel with the axis, and the cam pin is linearly moveable within the cam pin chassis;

wherein the stop ring has a central bore, a first surface, and a second surface comprising a spiral groove terminating at first and second stop surfaces, wherein the screw extends through the central bore and the cam pin engages the spiral groove; and wherein the turret cap has a central bore and the screw extends through the central bore such that the turret cap, stop ring, and cam pin chassis have a common rotational axis, and further wherein the turret cap has a first surface having a groove terminating at first and second stop surfaces and the first surface of the stop ring comprises a pin, wherein the pin of the stop ring engages the groove of the turret cap.

11. The rifle scope of claim 10, wherein a rotational limit of the turret is defined by one of the first and second stop surfaces of the stop ring.

12. The rifle scope of claim 10, wherein the groove of the turret cap extends from 300° to 720° around the turret screw.

13. The rifle scope of claim 10, wherein the rotational limits of the turret are defined by the one of the first and second stop surfaces of the stop ring and one of the first and second stop surfaces of the turret cap.

14. The rifle scope of claim 10, wherein rotation of the turret cap in a first direction causes the groove of the turret cap to move in a first direction, and wherein responsive to the pin engaging one of the first and second stop surface of the groove further rotation of the turret cap in the first direction causes rotation of the stop ring in the first direction.

15. The rifle scope of claim 14, wherein rotation of the turret cap in a second direction causes the groove of the turret cap to move in a second direction, and wherein responsive to the pin engaging the other of the first and second stop surface of the groove further rotation of the turret cap in the second direction causes rotation of the stop ring in the second direction.

16. The rifle scope of claim 10, wherein the spiral groove extends from greater than 360° to 1,080° around the turret screw.

17. The rifle scope of claim 10, wherein the spiral groove comprises at least two concentric arcs each centered on the screw axis and substantially encompassing the axis, the spiral groove including at least one transition portion connecting the at least two arcs.

18. The rifle scope of claim 10, wherein axial movement of the turret cap relative to the turret changes the turret from a locked position to an unlocked position.

* * * * *